United States Patent [19]
Hall

[11] 3,976,085
[45] Aug. 24, 1976

[54] AUTOMATIC CIGARETTE FEED MACHINE
[75] Inventor: Floyd Vameda Hall, Durham, N.C.
[73] Assignee: Liggett & Myers, Incorporated, Durham, N.C.
[22] Filed: Sept. 26, 1974
[21] Appl. No.: 509,702

Related U.S. Application Data
[63] Continuation of Ser. No. 353,372, April 23, 1973, abandoned.

[52] U.S. Cl. ............................... 131/25; 53/148
[51] Int. Cl.² ....................................... A24C 5/35
[58] Field of Search .............. 131/25.22 A, 21 R; 53/151, 59 R, 148; 198/165, 102, 190, 76, 44, 45

[56] References Cited
UNITED STATES PATENTS

| | | | |
|---|---|---|---|
| 1,403,098 | 1/1922 | Orstrom | 53/151 X |
| 1,868,583 | 7/1932 | Orstrom | 53/151 X |
| 2,195,371 | 3/1940 | Moore | 198/165 |
| 2,330,000 | 9/1943 | Molins | 131/25 R |
| 2,745,410 | 5/1956 | Molins | 131/21 R |
| 3,153,472 | 10/1964 | Mason | 131/25 UX |
| 3,155,221 | 11/1964 | Griner | 198/76 X |
| 3,187,482 | 6/1965 | Schubert | 53/148 X |
| 3,297,138 | 1/1967 | McCombie | 131/21 R X |
| 3,365,857 | 1/1968 | Lieptke | 53/148 |
| 3,389,777 | 6/1968 | Rysti | 198/262 |
| 3,437,189 | 4/1969 | Molins | 198/76 X |
| 3,495,696 | 2/1970 | Molins et al. | 198/165 |

FOREIGN PATENTS OR APPLICATIONS
324,556   1/1930   United Kingdom .................. 58/148

Primary Examiner—Robert W. Michell
Assistant Examiner—V. Millin
Attorney, Agent, or Firm—Michael L. Hendershot; J. Bowen Ross, Jr.

[57] ABSTRACT

The first conveyor is inclined to move the cigarettes from the cigarette making machine upwardly in single line fashion to the second conveyor which conveys the cigarettes horizontally in stacked fashion into the hopper of the cigarette packaging machine. The packaging machine is linked in a one-to-one relationship with the cigarette making machine and is capable of high speed production of at least 3600 cigarettes per minute.

11 Claims, 7 Drawing Figures

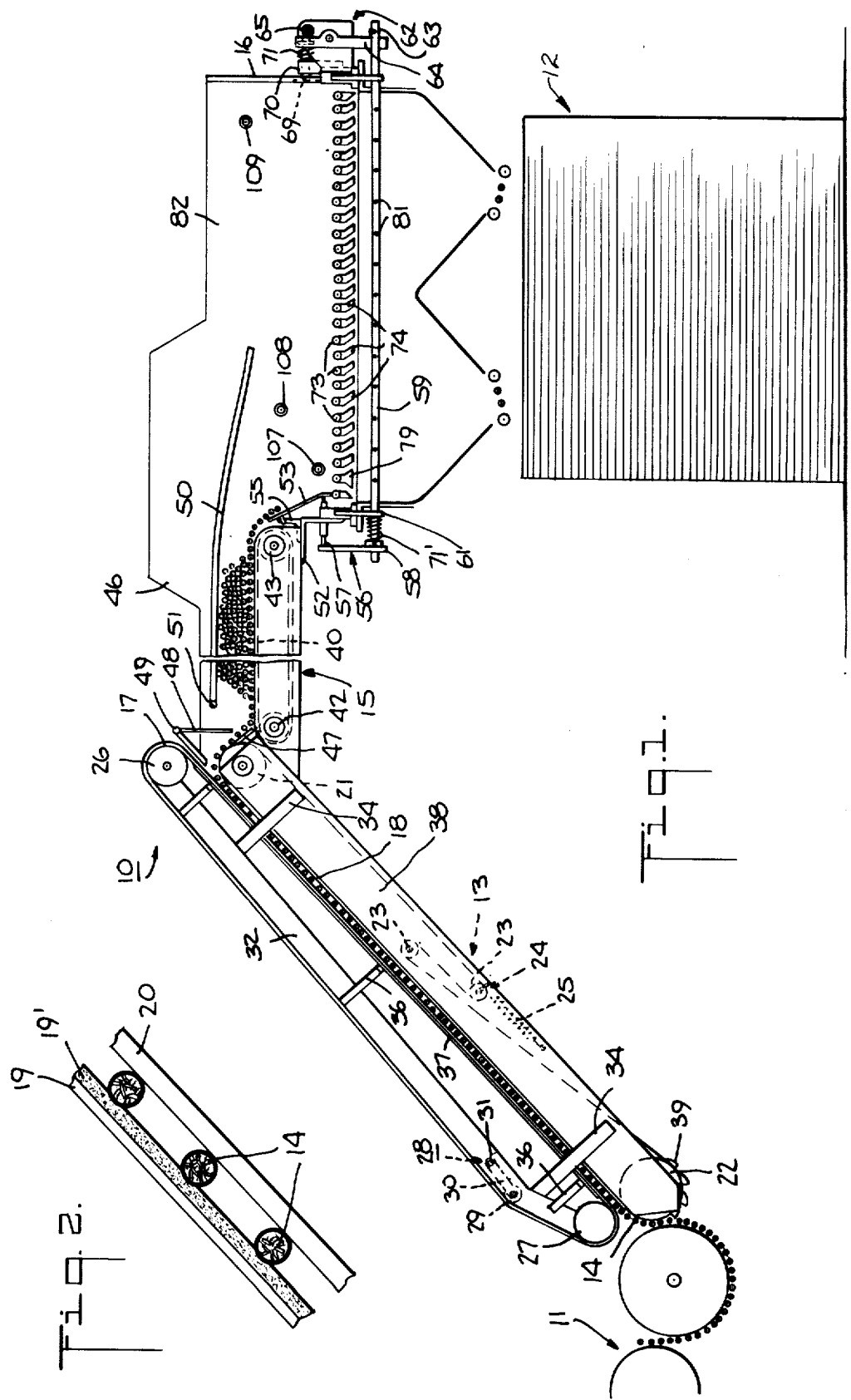

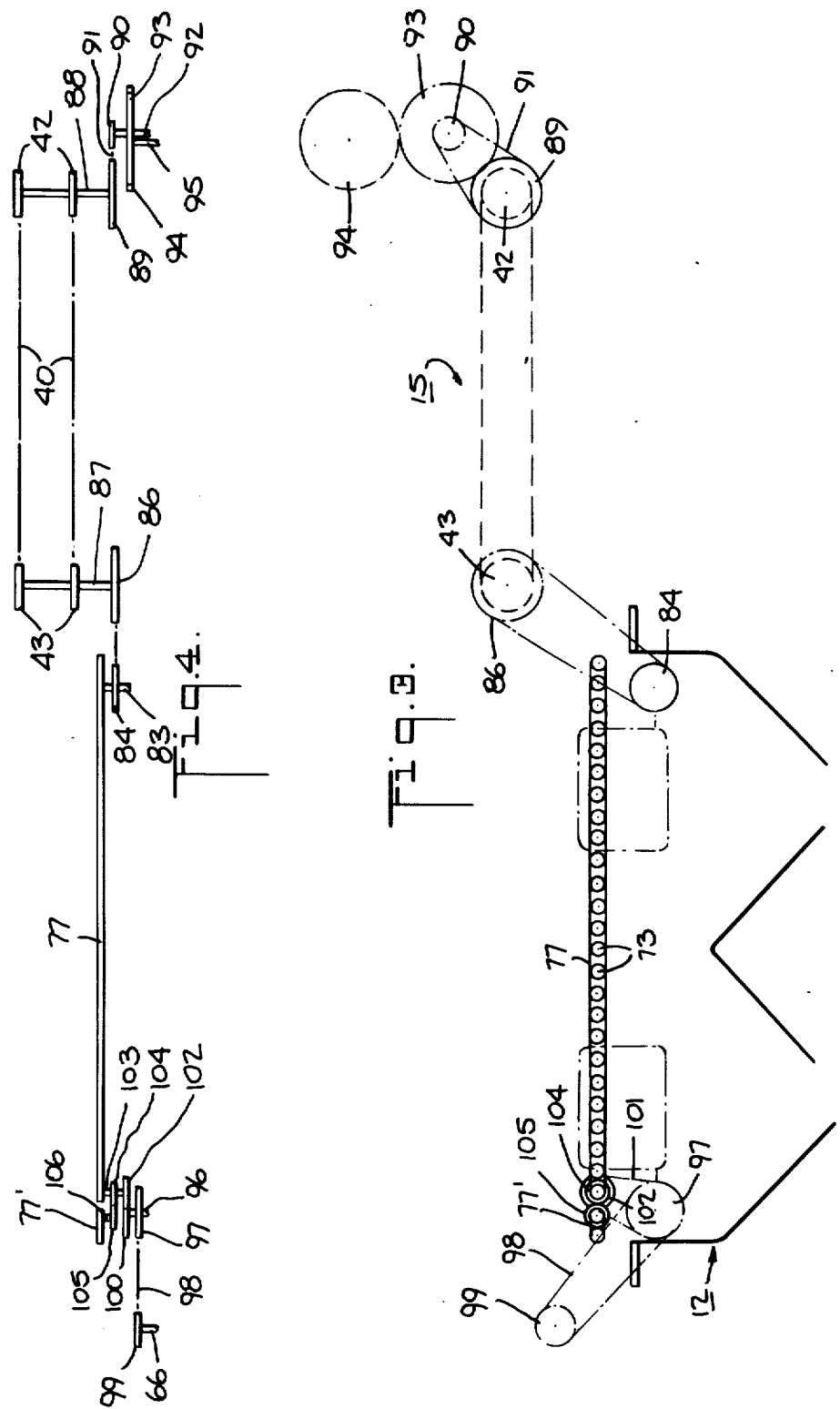

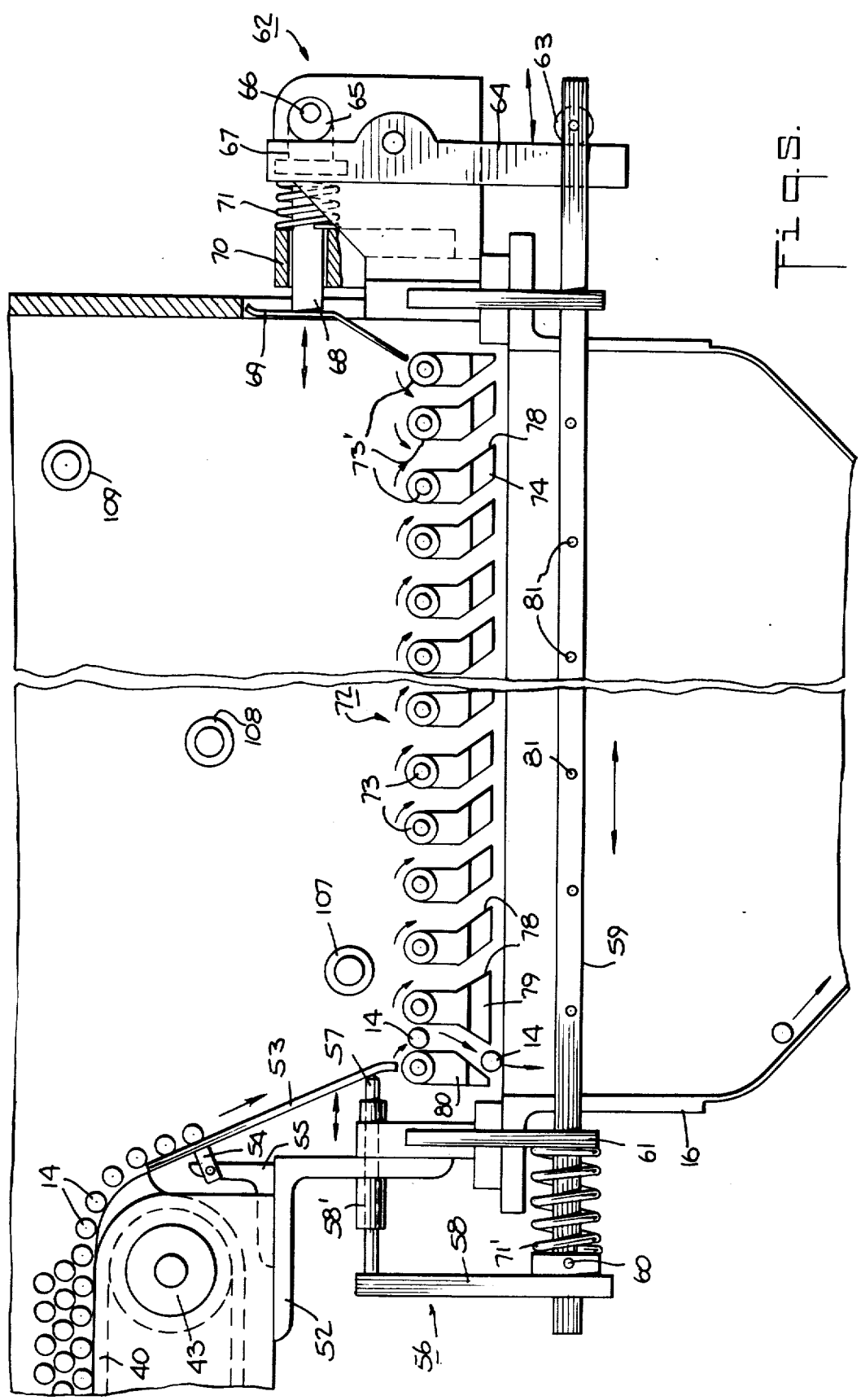

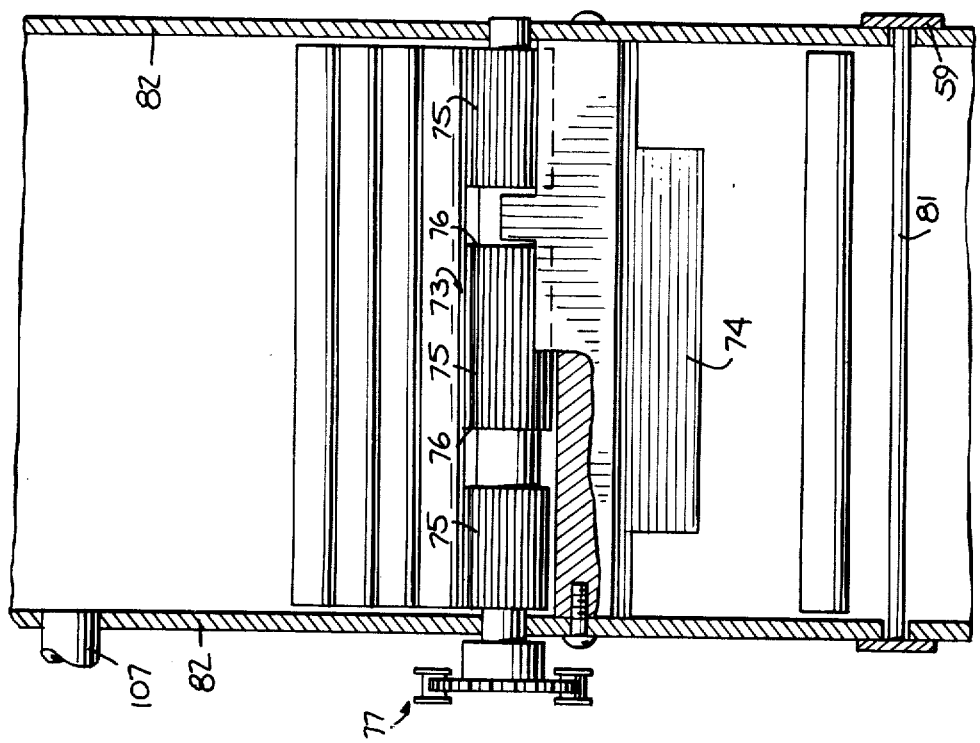
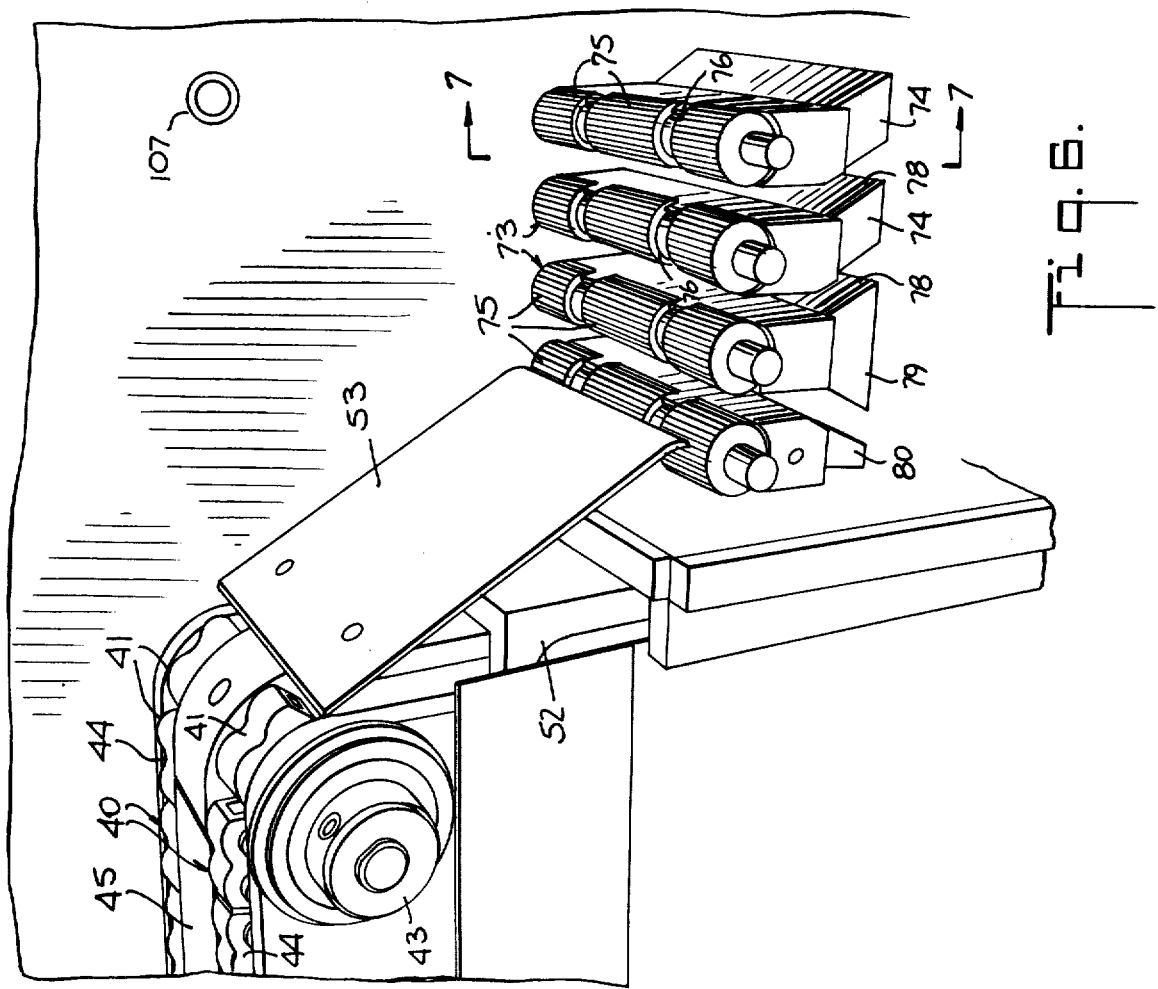

AUTOMATIC CIGARETTE FEED MACHINE

This is a continuation of application Ser. No. 353,372 filed Apr. 23, 1973, now abandoned.

This invention relates to a cigarette transfer apparatus. More particularly, this invention relates to an automatic cigarette feeding machine for conveying cigarettes from a cigarette making machine to a cigarette packaging machine.

Heretofore, in order to package cigarettes made in a cigarette making machine, various systems and techniques have been used. For example, it has been known to manually stack the made cigarettes as they are produced into cans which are then manually placed on a conveyor system and transferred to a cigarette packaging machine whereat the cans are manually removed from the conveyor system and mounted on the packaging machine. These cans have been adapted to the packaging machine in various manners so as to accommodate the dumping of the cigarettes into the packaging machines for packaging purposes. This type of system, however, has required substantial space for the conveyor system as well as a substantial amount of manual labor. Also, during transporation, the cigarettes in the lower rows of the cans can become crushed. Furthermore, such systems have generally been used so that the output of a number of cigarette making machines have been used as an input for a single packaging machine. In order to overcome the disadvantages of such a conveyor system, various types of conveyor systems have been proposed for feeding cigarettes directly from a cigarette making machine to a cigarette packaging machine. For example, it has been known to direct the output of two or more cigarette making machines into suitable receptacles mounted on an endless chain conveyor. In such cases, the cigarettes are discharged in bulk into the receptacles and conveyed in such receptacles over the hopper of a cigarette packaging machine. Upon reaching the hopper, the receptacles are tipped over so as to dump the cigarettes into the hopper for subsequent packaging within the packaging machine. In another instance, it has been known to discharge the output of a single cigarette making machine onto a conveyor system for delivery to a packaging machine. In some cases, these conveyor systems have included three runs which are operated so as to stack the cigarettes into three rows for passage into the packaging machine so as to provide a conventional cigarette package. In other cases, the cigarettes have been moved en masse along a conveyor system into the hopper of a packaging machine. However, these latter systems are either limited to a slow rate for example, 1200 packaged cigarettes per minute or have resulted in a substantial percentage of damaged cigarettes due to crushing and the like during transportation from the making machine to the packaging machines.

Other transfer machines have also been known wherein the cigarettes have been conveyed directly from a making machine to a packaging machine on a chain conveyor belt in single file relationship. In such machines, the feed rate has been confined to relatively low rates since an increase in speed of the machines has frequently caused the cigarettes being conveyed to fall off the machines due to vibration. Also, the vibration caused by increased speed has otherwise damaged the cigarettes. Further, the cigarettes may become skewed during conveyance and can thus cause jamming of the conveyor.

Accordingly, it is an object of this invention to move cigarettes from a high speed cigarette making machine to a high speed packaging machine at a high rate commensurate with the speed of the making and packaging machines.

It is aother object of the invention to provide a high speed apparatus for feeding the output of a cigarette making machine directly to the input of a cigarette packaging machine.

It is another object of the invention to link a cigarette making machine to a cigarette packaging machine in a one-to-one relationship.

It is another object of the invention to substantially reduce any damage to cigarettes during conveyance between a making machine and a packaging machine.

It is another object of the invention to provide a cigarette transfer apparatus which is of simple construction.

It is another object of the invention to provide a cigarette transfer apparatus which is made of a relatively few number of parts.

Briefly, the invention provides an automatic cigarette feed machine which delivers the output of a high speed cigarette making machine directly to the high speed cigarette packaging machine in a one-to-one relationship. The feed machine includes a pair of conveyors which are interconnected to each other so as to convey the cigarettes directly from the making machine to the packaging machine. The first conveyor is inclined with respect to a horizontal plane to receive the cigarettes individually from the cigarette making machine at the lower end and to convey the cigarettes in a sequential series to an elevated position at the upper end. The second conveyor is disposed in a substantially horizontal plane and extends from the upper end of the first conveyor to a position adjacent a hopper of a cigarette packaging machine. The second conveyor is positioned to receive the conveyed cigarettes from the first conveyor and is timed to operate at a speed less than the first conveyor so that the cigarettes accumulate on the second conveyor in stacked fashion during conveyance towards the hopper of the packaging machine.

The first inclined conveyor is constructed of suitable means so as to move the cigarettes from the making machine in single file series without damaging the cigarettes. To this end, the first conveyor, for example, is constructed of endless belts which form a lower run and an upper run which are spaced apart at approximately the diameter of the spaced cigarettes. The cigarettes are thus carried between the upper and lower runs under a slight conveying force upwardly towards the second conveyor. The endless belts of this first conveyor can be formed of any suitable resilient flexible material so as to receive the cigarettes therebetween while permitting the cigarettes to indent into the material of the belts a sufficient amount to permit conveyance of the cigarettes while at the same time avoiding damage to the cigarettes.

The second conveyor can be constructed of any suitable construction, for example, of endless belts of interconnected chain pushers which are capable of conveying the stacked cigarettes along the conveyor to the packaging machine. In addition, a platform can be disposed between a pair of endless belts of chain pushers so as to further lend to the support of the stacked cigarettes during conveyance.

In order to deliver the cigarettes from the second conveyor of the feed apparatus into the hopper of the packaging machine any suitable guide means can be used. For example, the cigarettes may be deposited directly into the hopper by rolling down a guide plate mounted at the end of the conveyor. In addition, the guide plate can be oscillated by a suitable mechanism so as to prevent jamming of the cigarettes at the point of deposit into the hopper. The hopper may also be provided with suitable segregating means for segragating the delivered cigarettes into rows for subsequent passage through the hopper as well as with a suitable agitator means for agitating the cigarettes within the hopper in order to prevent jamming.

The drive for the conveyors of the feed machine can be connected to the drive of the making machine so that the feed apparatus can be synchronized to the operation of the making machine. In addition, a detection means can be mounted on the hopper to detect the amount of cigarettes within the hopper and cause a change in the packaging rate of the packaging machine depending upon the detected amount. For example, a photocell system can be used to detect a number of different levels of cigarettes within the hopper. Thus, when the level of cigarettes in the hopper reaches a high position which indicates that the packaging machine is packaging at a rate slower than the delivery rate of the cigarettes, the detection means causes a speed up of the packaging machine rate to lower the level of cigarettes. On the other hand, should the cigarette level reach a low level which would indicate that the packaging machine is operating at a faster rate than the delivery speed, the machine would be slowed down via the detection means.

The feed apparatus of the invention thus permits a high speed cigarette making machine to be used with a high speed packaging machine. For example, the rate of output of the making machine and the packaging machine can be 3600 cigarettes per minute or higher.

These and other objects and advantages of the invention will become more apparent when taken in conjunction with the following detailed description and the accompanying drawings in which:

FIG. 1 illustrates a side view of an automatic feed machine according to the invention located between a cigarette making machine and a cigarette packaging machine;

FIG. 2 illustrates an enlarged fragmentary view of the conveying belts of the inclined conveyor of FIG. 1;

FIG. 3 schematically illustrates a drive transmission for the feed machine of the invention as well as a separate drive transmission connected to an agitator means in the hopper of a cigarette packaging machine;

FIG. 4 illustrates a plane view of the transmission of FIG. 3;

FIG. 5 illustrates an enlarged detailed side view of the delivery end of the feed machine of the invention and the segragating means and agitating means of the hopper of the packaging machine;

FIG. 6 illustrates a part perspective view of the delivery end of the feed machine of the invention; and FIG. 7 illustrates a view taken on line 7—7 of FIG. 6.

Referring to FIG. 1, the cigarette feed machine 10 is disposed between a cigarette making machine 11 and a cigarette packaging machine 12. The cigarette making machine 11 is of conventional structure and therefor is not further shown or described. Similarly, the packaging machine 12 is of coventional structure and therefor need not be further described.

The feed machine 10 includes a first conveyor 13 which conveys the made cigarettes 14 from the making machine 12 to an elevated position and a second conveyor 15 which transfers the elevated cigarettes 14 into a hopper 16 of the cigarette packaging machine 12. The first conveyor 13 is constructed with an upper run 17 and a lower run 18 between which a plurality of cigarettes 14 are conveyed in single file fashion in sequential series from the cigarette making machine 11 to the elevated position. The upper and lower runs 17, 18 of the inclined conveyor 13 are sustantially identical in structure and are each composed of a pair of spaced apart endless belts 19, 20. The belts 19 of the upper runs are spaced from the belts 20 of the lower run by a distance slightly less than the diameter of the conveyed cigarettes 14 (FIG. 2), and are of a resilient material so that the cigarettes can indent into the belts 19. In this way, the stream of conveyed cigarettes are held by the respective belts under a force sufficient for conveying cigarettes while at the same time the force is insufficient to crush or otherwise damage the cigarettes. For example, the belts 19 can be made of a material such as nylon with a cushioning layer of felt 19' bonded thereto for contacting the cigarettes while the lower run belts 20 can be of a relatively "hard" material i.e. rubber or nylon.

Referring to FIG. 1, the belts 20 of the lower run 18 are disposed about a drive roller 21 at the upper end of the conveyor 13 and each extend around a flanged outer race ring of a ball bearing (not shown) rotatably mounted on a dispensing roller 22 of the making machine 11 at the lower end as well as over the rollers 23 of a tensioning device 24 located within the plane of the frame 38 of the lower run. The tensioning device 24 is biased by a spring 25, as is known, so as to maintain a suitable tension in the belts 20 for conveyance of the cigarettes 14. The belts 19 of the upper run 17 pass over a driven roll 26 at the upper end of the run 17 and an idler roller 27 at the lower end of the run as well as over a tensioning device 28 located in the plane of the frame 32 of the upper run. The driven roll 26 is coupled to the drive roll 21, as explained below so as to be driven in synchronism therewith. The tensioning device 28 is constructed of a pair of rollers 29 which contact each of the belts 19, respectively, levers 30 which rotatably mount the rollers 29 at one end thereof and which, in turn, are pivotally mounted on a threaded screw 31 secured to the frame 32 for the upper run 17. In order to provide for an adjustment of the tension device 28 and, in turn, the tension in the belts 19, the threaded screw 31 can be loosened and then tightened after the roller 29 is moved to a desired position. As shown, the frame 32 for the upper run 17 is supported by suitable brackets 34 on the frame 38 for the lower run 18 and journals the rollers 26, 27 therein. Also, dependent guide shoes 36 are secured to the frame 32 of the upper run 19 to carry guide bars 37 which guide the belts 19 in parallel manner to the belts 20 of the lower run 18. The frame 38 of the lower run 18 can be of any suitable construction to journal the rollers 21, 22, 23 therein and to mount the belts 20 and tensioning device 24 thereon.

The lower roller 22 of the lower run 18 which is normally a part of the making machine 11 is provided with a pair of toothed flanges 39 which extend radially outwardly of the roller 22. The toothed flanges 39 are each shaped so as to convey the cigarettes 14 from the cigarette making machine 11 directly out of the machine 11 into the space between the belts 19, 20 of the feed machine 10. In this respect, the flanged bearings which mount the belts 19 thereon are independent of the rotation of the roller 22 of the cigarette making machine 11, so that should the making machine 11 and conveyor 13 both be deactivated, the last cigarette delivered to the inclined conveyor 13 will reach the upper end of the conveyor 13 and be deposited onto the second conveyor 15 even though the machine 11 is braked to a stop. This is facilitated by stopping the conveyor 13 on a time delay with respect to stopping of the making machine 11.

The horizontal conveyor 15 of the feeding machine 10 is disposed in a horizontal plane so as to receive the cigarettes 14 delivered from the inclined conveyor 13 and to transfer the cigarettes in stacked fashion to the hopper 16 of the packaging machine 12. This horizontal conveyor 15 is constructed, for example, with a pair of endless belts 40 of interconnected chain pushers 41 (FIG. 6). The endless belts 40 are disposed about a pairs of toothed sprockets 42, 43, one pair of which is driven, as described below, and the other pair of which is coupled to the drive roller 21 of the first conveyor 13. The chain pushers 41 of the belts 40 can be of any suitable structure to be driven by the sprockets 42, 43. For example, each pusher 41 is provided with a depressed central portion 44 and each pusher is slightly spaced from the adjacent pushers so that a further depressed portion is formed between adjacent pushers. In this way, the chain pushers 41 provide suitable depressions for conveying the cigarettes therealong. In addition, the second conveyor 15 includes a platform 45 located between the endless belts 40 which can be made of any suitable material such as of wood, steel, formica, etc. to support the conveyed cigarettes. The remainder of the conveyor 15 is of known construction and need not be further described.

Referring to FIG. 1, the second conveyor 15 is provided with a pair of upstanding walls 46 to either side so as to provide a channel for the transportation of the cigarettes 14 in a stacked fashion along the conveyor. To this end, each wall 46 can be formed of a transparent material such as plexiglass so that the conveyed cigarettes can be viewed. In addition, one of the walls 46 can be mounted in a hinged fashion (not shown) so as to be pivoted away from the stacked cigarettes to permit access to the channel in the event that any cigarettes become skewed during transportation thereof. As shown, the walls 46 of transparent material can extend upwardly a sufficient distance to maintain a substantial number of rows of stacked cigarettes therebetween.

In order to aid in the guiding of the cigarettes from one conveyor 13 to the next conveyor 15, a suitable guide means in the form of a plate 47 is mounted on the second conveyor 15 adjacent to the end of the first inclined conveyor 13 to allow the delivered cigarettes to slide down onto the chain pushers 40. Such a plate 47 can also be secured to the inclined conveyor 13 and be otherwise shaped to prevent jamming of a cigarette between the conveyors 13, 15. In addition, a hold-down flap 48 such as a piece of canvas which is supported on a pin 49 mounted in the frame 38 of the conveyor can be used so as to further facilitate delivery of the cigarettes 14 onto the conveyor 15 in an orderly manner. The flap 48 is loosely supported so as to be pushed aside from the flow of cigarettes of the inclined conveyor onto the horizontal conveyor. Also, a hold-down belt 50 of similar material to the flap 48 can be mounted, as by a pin 51, on the walls 46 to extend throughout the channel so as to hold down the stacked cigarettes.

The feed machine conveyors 13, 15 are mounted on the respective making machine 11 and packaging machine 12 in any suitable fashion. For example, the lower end of the frame 38 of the inclined conveyor 13 is secured to the making machine 11 while the end of the horizontal conveyor frame is supported on a bracket 52 secured to the packaging machine 12.

Referring to FIGS. 1, 5 and 6, a suitable guide 53 is also mounted between the delivery end of the horizontal conveyor 15 and hopper 16 of the packaging machine 12 so as to facilitate the delivery of the cigarettes 14 into the hopper 16 while preventing jamming of the cigarettes. This guide 53 is constructed as a plate which is pivotally mounted by arms 54 near the upper end on a bracket 55 secured to the bracket 52. In addition, the plate 53 is oscillated by a reciprocating means 56 which is mounted on the hopper 16. This reciprocating means 56 includes a pin 57 which abuts the guide plate 53 near the lower end thereof and is slidably mounted in a sleeve 58' fixed on the frame of the hopper 16. The pin 57 is fixed at one end to an arm 58 which in turn is secured on a bar 59, as by a threaded screw 60 passing through an enlarged collar formed integrally on the arm 58. The bar 59 is slidably mounted in a pair of dependent guides 61 on the hopper 16.

In order to reciprocate the bar 59, an agitating means 62 is secured to the opposite end of the bar 59. This means 62 includes a cam roller i.e., a roller which functions as a cam, 63 which abuts against a lever 64 which is pivotally mounted above the bar 59 on the frame of the hopper 16. This lever 64 in turn abuts a bearing 65 which is mounted on an eccentric stub shaft end of a drive shaft 66 journaled in a frame of the packaging machine 12. Thus, as the drive shaft 66 rotates the bearing 65 causes the lever 64 to pivot about an intermediate pivot point with a consequent movement being imparted to the elongated bar 59 (i.e. to the right as viewed). In addition, the drive shaft 66 has a cam 67 mounted intermediately thereof which abuts a spring loaded pusher 68 which carries a plate 69 at the end. The plate 69 is disposed within the hopper 16 opposite the guide plate 53 so as to further aid in the agitation of the cigarettes inside the hopper 16. The pusher 68 is slidably mounted within a suitable bracket 70 secured to the hopper 16 and a spring 71 is disposed between the bracket 70 and the end of the pusher 68 adjacent the cam 67 of the drive shaft 66 to bias the pusher 68 toward the drive shaft 66. Further, a spring 71' is disposed about the bar 59 between the guide 61 and the arm 58 so as to bias the bar 59 in a direction opposite to the direction in which the lever 64 moves the bar 59 (i.e. to the left as viewed).

Referring to FIGS. 1 and 5, a suitable segregating means 72 can also be mounted in the hopper 16 so as to guide the cigarettes initially deposited into the hopper 16 into rows for further conveyance through the hopper 16 into the packaging machine 12. To this end, the segregating means 72 is formed of a plurality of rolls 73 each of which is mounted over a guide block 74.

Referring to FIGS. 6 and 7, each roller 73 as is known, except for the farmost three 73' with respect to the direction of flow, is formed with knurled portions 75 so as to engage the surface of the cigarettes and with recessed portions 76 between the knurled portions 75. The farmost three rollers 73' are smooth surfaced but grooved. In addition, each roller 73, 73' is driven at one end by a suitable drive 77, such as a chain drive, so as to be continuously rotated as the cigarettes are moved through the hopper 16. Also, the guide blocks 74 are spaced apart and are shaped in such a manner so as to guide the cigarettes downwardly first in a vertical path and then in a slightly inclined path so that the cigarettes instead of falling directly under gravity are allowed to roll down the inclined portions 78 of the guide blocks 74 without being crushed. The segregating means 72 thus serves to distribute the cigarettes across the width of the hopper. As shown, the passageways formed by the guide blocks 74 can be substantially the same with the end passageway at one end being made as a mirror image of the others by suitably shaped blocks 79, 80. Also, as shown, the rollers 73 are rotated in the same direction except for the last two on the right hand side.

Referring to FIG. 5, a further agitating means 81 can also be mounted on the hopper in order to prevent jamming of the cigarettes. This agitating means 81 is in the form of a plurality of pins which extend perpendicularly from the bar 59 in spaced relation across the width of the hopper 16. These pins serve to pass between the cigarettes and to cause sifting of the cigarettes during a horizontal reciprocating motion of the bar 59.

As shown, the hopper 16 is provided with a pair of upstanding walls 82 which are a continuation of the walls 46 so that a continuous channel is formed between the conveyor 15 and hopper 16.

Referring to FIGS. 3 and 4, the feed machine 10 is driven by a drive motor (not shown) which is independently mounted on the frame of the packaging machine 12 or in any other suitable location. The drive motor has a drive shaft 83 on which a suitable gear 84 is fixed. This gear 84 is connected via a chain pulley 85 to a gear 86 secured to a shaft 87 on which the sprockets 43 of the endless chain belts 40 are driven. In this way, the drive from the drive motor is caused to drive the horizontal conveyor 15. In addition, through the endless chain belts 40, the idle sprockets 42 which are mounted on a shaft 88, drive a gear 89 mounted at the end of the shaft 88. This gear 89 in turn drives a gear 90 over a chain 91 which is mounted on a shaft 92 which carries a driving gear 93 and the drive roller 21 of the inclined conveyor 13. The gear 93 of the shaft 92 meshes with a similar gear 94 secured to the shaft 95 which drives the roller 26 of the upper run 17 of the inclined conveyor 13. In this way, upon actuating of the drive motor, the horizontal conveyor 15 is actuated and in turn actuates the inclined conveyor 13.

A second drive motor (not shown) is also mounted on the hopper 16 of the packaging machine 12 and is operated independently of the first drive motor. This second motor has a drive shaft 96 on which a first gear 97 is mounted to drive via a chain 98 and a gear 99, the drive shaft 66 of the agitating means 62. In addition, the motor drive shaft 96 drives over a second gear 100 and chain 101 a gear 102 mounted on a drive shaft 103 for the chain drive 77 for the rollers 73. In addition, the shaft 103 carries a gear 104 which meshes with a gear 105 to drive a shaft 106. This shaft 106 drives the chain drive 77' for the last two rollers 73' mentioned above. Thus, when the motor is actuated the agitating means 62 and segregating means 72 are simultaneously activated. Generally, this motor is synchronized with the operation of the packaging machine 12 such that the segregating means 72 and agitating means 62 are operated only when the packaging machine 12 is in operation.

Referring to FIG. 5, the packaging machine 12 is further provided with a sensing means 106 which senses the level of cigarettes within the hopper 16 above the segregating rollers 73. For example, the sensing means 106 includes three photoelectric cells 107, 108 and 109 which are disposed at three different levels with respect to the hopper 16 and which are electrically connected into the drive motor (not shown) of the packaging machine 12. The three photoelectric cells are disposed so as to detect three levels for the cigarettes and control the speed of the packaging drive motor in response thereto. For example, when the level of cigarettes in the hopper 16 sinks to the level of the lowermost photocell 107, the photocell 107 actuates the drive motor, for example, over a clutch mechanism to cause the packaging machine 12 to slow in speed to package at a slower rate. This will cause the supply of cigarettes in the hopper to accumulate above the photocell 107 during continued packaging. On the other hand, the uppermost photocell 109 is connected into the drive motor so as to increase the speed of the packaging machine so as to increase the packaging rate while reducing the supply of cigarettes in the hopper 16. The middle photocell 108 can be used to vary the speed of the machine about a medium speed. For example, the packaging machine 12 can be operable over a range of 130 packs of twenty cigarettes per minute to 200 packages of cigarettes per minute with a intermediate range of 180 packs per minute. The highest photocell 109 is then set to speed the packaging machine up to 200 packs per minute rate while the lowermost photocell 107 is used to slow the machine to the 130 pack rate. The middle photocell 108 would be used to vary the machine about the 180 pack rate.

In operation, with the cigarette making machine 11 in operation, a row of cigarettes 14 is continuously fed out of the machine 11 between the runs 17, 18 of the inclined conveyor 13. The conveyor 13 then conveys the steady stream of cigarettes in individually spaced alignment upwardly to the end of the conveyor 13. At this point, the cigarettes 14 are deposited onto the horizontal conveyor 15 while passing over the plate 47. Since the speed of the horizontal conveyor 15 is slower than the first conveyor 13, for example, by a 1 to 4 ratio, the cigarettes 14 begin to accumulate at a point downstream of the receiving point. The cigarettes then begin to stack up on the horizontal conveyor 15 while being conveyed to the delivery point in the hopper 16. Upon reaching the end of the horizontal conveyor 15 (FIG. 5) the cigarettes 14 slide down the reciprocating guide plate 53 into the area above the segregating rollers 73. Thereafter, the cigarettes are distributed across the segregating rollers 73 and are guided through the guide blocks past the agitating bar 59 into the chutes (not shown) of the packaging machine 12. The cigarettes are then packaged in the usual fashion.

The invention thus provides a cigarette feeding machine which is completely automatic and which is able to deliver in a one-to-one ratio the entire output of a cigarette making machine to a cigarette packaging machine in a rapid and simple manner without damaging the cigarettes conveyed. Since the cigarettes are conveyed along the conveyor in single row fashion to the elevated position there is little danger of any crushing or jamming of the cigarettes within the machine. To this end, it is noted that should a cigarette become skewed within the runs of the inclined conveyor 13, that the cigarettes being conveyed behind the skewed cigarette will push the skewed cigarette forwardy onto the horizontal conveyor. Further, since the stack of cigarettes conveyed on the horizontal conveyor is substantially at a minimum, there is little danger that the cigarettes will become damaged during conveyance.

The invention further provides a feed machine which is constructed of relatively few parts. Thus, the maintenance of the feed machine can be kept to a minimum. Further, the feed machine can be constructed as a single portable unit so as to be interposed between a cigarette making machine and a cigarette packaging machine or can be made to be adapted for fixed mounting between such machines.

Further, the invention provides a feed machine which can be synchronized directly with a cigarette making machine so that the entire output of a making machine no matter the output speed is conveyed in a synchronized manner into the feed machine in a one-to-one relation.

It is noted that the cigarettes which are conveyed along the feed machine are subjected to a minimum of forces such that the feed machine is suitable for any high speed making machine. For example, while the present machine have been generating cigarettes at packaging rates of 3600 cigarettes per minute, the automatic feed machine of the invention is capable of greater speeds. That is, the speed of the feeding machine is keyed to the speed of the making machine so that as making machines are produced with greater output capacities, the feeding machine is merely set to operate at the same speed.

What is claimed is:
1. In combination in a one-to-one relationship,
   a cigarette making machine for producing cigarettes at a high rate of speed, wherein said making machine includes a means for dispensing cigarettes individually in a spaced relationship,
   a cigarette packaging machine for packaging cigarettes at approximately said high speed rate, and
   a cigarette feed machine connected between said making machine and said packaging machine to convey the cigarettes made in said making machine directly to said cigarette packaging machine at a rate equal to said high speed rate, said cigarette feed machine including a first conveyor inclined with respect to a horizontal plane for receiving and conveying the cigarettes in said spaced relationship from said making machine individually to an elevated portion in a sequential series, a second horizontal conveyor extending from under said first conveyor to receive the series of cigarettes therefrom and to convey the received cigarettes in stacked fashion to said packaging machine, and means for driving said second conveyor at a speed less than the speed of said first conveyor to permit the received cigarettes on said second conveyor to accumulate thereon into said stacked fashion during conveyance.

2. The combination as set forth in claim 1 wherein said first conveyor includes a pair of runs spaced apart at approximately the diameter of the conveyed cigarettes to convey the series of cigarettes therebetween.

3. The combination as set forth in claim 1 wherein said dispensing means of said making machine includes a dispensing roller for dispensing cigarettes therefrom, and said first conveyor includes a pair of endless belts disposed about said dispensing roller to form a first run.

4. The combination as set forth in claim 3 wherein said first conveyor includes a second endless run spaced from said first run at approximately the diameter of the conveyed cigarettes.

5. The combination as set forth in claim 1 wherein the dispensing means of said making machine includes a peripherally toothed roller for discharging the cigarettes individually in spaced relation and said first conveyor includes at least one endless belt adjacent said roller to receive the discharged cigarettes thereon and at least another endless belt spaced from said one endless belt to convey the discharged cigarettes therebetween, said belts forming runs spaced apart a distance slightly less than the diameter of a conveyed cigarette.

6. The combination as set forth in claim 1 wherein said packing machine includes a hopper to receive the cigarettes from said feed machine, a plurality of rollers in said hopper to segregate the cigarettes therein into rows, a plurality of means defining confined tortuous passageways extending below and between said rollers to sift the cigarettes and an agitator for moving the cigarettes below said means to prevent jamming in said hopper.

7. The combination as set forth in claim 1 wherein said packing machine includes a hopper to receive the cigarettes from the feed machine, and which further comprises a detection means for adjusting said predetermined rate of said packaging machine in response to predetermined levels of cigarettes in said hopper.

8. In combination, in a one-to-one relationship,
   a cigarette making machine for producing cigarettes at a high rate of speed wherein said making machine includes a means for dispensing cigarettes individually in a spaced relationship,
   a cigarette packaging machine for packaging cigarettes at approximatley said high speed rate, and
   a cigarette feed machine connected between said making machine and said packaging machine to convey the cigarettes from said making machine to said packaging machine, said feed machine including a first conveyor connected to said making machine for receiving and conveying the cigarettes in said spaced relationship therefrom individually in a sequential series, a second conveyor downstream of said first conveyor for receiving and conveying the cigarettes from said first coveyor in stacked fashion to said packaging machine, and means for driving said second conveyor at a speed less than said first conveyor to permit the received cigarettes on said second conveyor to accumulate thereon into said stacked fashion during conveyance.

9. The combination as set forth in claim 8 wherein said first conveyor conveys the cigarettes to an elevated position and said second conveyor is mounted below said elevated position.

10. The combination as set forth in claim 8 wherein said means for driving drives said second conveyor at a speed ratio of 1 to 4 relative to said first conveyor.

11. The combination as set forth in claim 8 wherein said second conveyor is horizontally disposed and said packaging machine includes a hopper at a delivery end of said horizontal second conveyor to receive the conveyed cigarettes.

* * * * *